(12) United States Patent
Wang et al.

(10) Patent No.: US 8,836,651 B2
(45) Date of Patent: Sep. 16, 2014

(54) TOUCH PANEL

(75) Inventors: Yi-Long Wang, Hsin-Chu (TW);
Ming-Lun Hsieh, Hsin-Chu (TW);
Jian-Shen Yu, Hsin-Chu (TW);
Min-Feng Chiang, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 493 days.

(21) Appl. No.: 13/053,569

(22) Filed: Mar. 22, 2011

(65) Prior Publication Data
US 2011/0254783 A1 Oct. 20, 2011

(30) Foreign Application Priority Data

Apr. 19, 2010 (TW) ................................ 99112187 A

(51) Int. Cl.
*G06F 3/041* (2006.01)
(52) U.S. Cl.
CPC .............. *G06F 3/041* (2013.01); *G06F 3/0416* (2013.01)
USPC ........................................................ 345/173
(58) Field of Classification Search
CPC ........................................................ G06F 3/041
USPC ........................................................ 345/173
See application file for complete search history.

(56) References Cited

U.S. PATENT DOCUMENTS

| 4,205,199 | A | * | 5/1980 | Mochizuki | ................. | 178/18.03 |
| 8,525,799 | B1 | * | 9/2013 | Grivna et al. | ................. | 345/173 |
| 2004/0100431 | A1 | * | 5/2004 | Yoshida | ........................... | 345/82 |
| 2005/0174299 | A1 | * | 8/2005 | Park et al. | ........................ | 345/1.1 |
| 2006/0097991 | A1 | * | 5/2006 | Hotelling et al. | .............. | 345/173 |
| 2007/0008299 | A1 | * | 1/2007 | Hristov | ........................... | 345/173 |
| 2007/0146349 | A1 | * | 6/2007 | Errico et al. | .................... | 345/174 |
| 2008/0062148 | A1 | * | 3/2008 | Hotelling et al. | .............. | 345/174 |
| 2008/0170195 | A1 | | 7/2008 | Kwon et al. | | |
| 2009/0085891 | A1 | | 4/2009 | Yang et al. | | |
| 2009/0167713 | A1 | | 7/2009 | Edwards | | |
| 2009/0244021 | A1 | | 10/2009 | Matsuo et al. | | |
| 2009/0321148 | A1 | | 12/2009 | Hsu et al. | | |
| 2010/0110038 | A1 | * | 5/2010 | Mo et al. | ........................ | 345/174 |
| 2010/0149108 | A1 | * | 6/2010 | Hotelling et al. | .............. | 345/173 |
| 2010/0156811 | A1 | * | 6/2010 | Long et al. | ..................... | 345/173 |
| 2010/0188345 | A1 | * | 7/2010 | Keskin et al. | ................... | 345/173 |
| 2011/0115718 | A1 | * | 5/2011 | Hsieh et al. | .................... | 345/173 |
| 2011/0141040 | A1 | * | 6/2011 | Kang et al. | ..................... | 345/173 |
| 2011/0291982 | A1 | * | 12/2011 | Hsieh et al. | .................... | 345/174 |

FOREIGN PATENT DOCUMENTS

| CN | 101847066 | 9/2010 |
| TW | 201001260 | 1/2010 |

OTHER PUBLICATIONS

Taiwan Patent Office, "Office Action", Sep. 11, 2013.

* cited by examiner

*Primary Examiner* — Claire X Pappas
*Assistant Examiner* — Robert Stone
(74) *Attorney, Agent, or Firm* — WPAT, PC; Justin King

(57) ABSTRACT

A touch panel includes a plurality of driving lines, a plurality of sensing lines and a plurality of sensing units. The sensing lines are arranged intersecting with the driving lines. The sensing units are arranged in an array, and each of the sensing units is electrically coupled to a corresponding one of the driving lines and a corresponding one of the sensing lines. The driving lines or the sensing lines only pass through a single side of the touch panel.

6 Claims, 3 Drawing Sheets

TOUCH PANEL

BACKGROUND

1. Technical Field

The present invention generally relates to the touch detection field, and more particularly to a touch panel with large size.

2. Description of the Related Art

With the rapid development of the science and technology, touch panels are widely applied into various electronic devices and become a novel human-machine interface since it is more intuitional and humanistic in use.

Referring to FIG. 1, which is a schematic structural view of a conventional touch panel. As shown in FIG. 1, the touch panel 10 comprises a plurality of driving lines 11, a plurality of sensing lines 12 and a plurality of sensing units 13. The driving lines 11 are arranged intersecting with the sensing lines 12. The sensing units 13 are arranged in an array, and each of the sensing units 13 is electrically coupled to a corresponding one of the driving lines 11 and a corresponding one of the sensing lines 12, such that each of the sensing units 13 can be provided with a driving signal through the corresponding driving line 11 and generate a sensing signal read out through the corresponding sensing line 12 to judge/determine whether the sensing unit 13 is touched or not.

As shown in FIG. 1, the sensing units 13 in a same row are all electrically coupled to a same driving line 11, and the sensing units 13 in a same column are all electrically coupled to a same sensing line 12. That is, the driving lines 11 only pass through one side of the touch panel 10 to electrically couple to a driving circuit (not shown), and the driving lines 11 transmit the driving signals in a first direction X to the sensing units 13 in each of the rows. The sensing lines 12 only pass through one side of the touch panel 10 to electrically couple to a readout circuit (not shown), and the sensing lines 12 read out the sensing signals in a second direction Y generated from the sensing units 13 in each of the columns.

However, each of the driving lines of the touch panel 10 needs to drive a lot of sensing units 13, and each of the sensing lines thereof needs to read out the sensing signals from a lot of sensing units 13. Thus it is prone to a problem of excessive RC loading and causing attenuation of relevant signals. Furthermore, the larger of the size of the touch panel 10, the more serious of the above-mentioned problem. Thus it greatly limits the trend toward large sized touch panels.

BRIEF SUMMARY

Accordingly, the present invention is directed to a touch panel, can decrease a RC loading and avoid signal attenuation.

A touch panel in accordance with an exemplary embodiment of the present invention is divided into a first region, a second region, a third region and a fourth region. The first region and the second region are arranged along a first direction, and the third region and the fourth region are arranged along the first direction. The first region and the third region are arranged along a second direction, and the second region and the fourth region are arranged along the second region. The first direction is different from e.g., substantially perpendicular to the second direction, and each of the first through fourth regions comprises a plurality of driving lines, a plurality of sensing lines and a plurality of sensing units. The sensing lines are arranged intersecting with the driving lines. The sensing units are arranged in an array, and each of the sensing units is electrically coupled to a corresponding one of the driving lines and a corresponding one of the sensing lines. Moreover, the driving lines or the sensing lines of the first through fourth regions a single side of the touch panel. The sensing units of the first region or the third region in a same row along the first direction are electrically coupled to one of the driving lines while the sensing units of the second region or the fourth region in the same row along the first direction are electrically coupled to another one of the driving lines if the driving lines of the first through fourth regions only pass through the single side of the touch panel; and the sensing units of the first region or the second region in a same column along the second direction are electrically coupled to one of the sensing lines while the sensing units of the third region or the fourth region in the same column along the second direction are electrically coupled to another one of the sensing lines if the sensing lines of the first through fourth regions only pass through the single side of the touch panel.

In a preferred exemplary embodiment, the sensing lines of each of the first through fourth regions pass through the single side of the touch panel. The driving lines of the first region and the driving lines of the second region respectively pass through two opposite sides of the touch panel, and the driving lines of the third region and the driving lines of the fourth region respectively pass through the two opposite sides of the touch panel. In addition, the sensing lines of the third region pass through the first region, and the sensing lines of the fourth region pass through the second region.

In a preferred exemplary embodiment, the driving lines of each of the first through fourth regions pass through the single side of the touch panel. The sensing lines of the first region and the sensing lines of the third region respectively pass through two opposite sides of the touch panel, and the sensing lines of the second region and the sensing lines of the fourth region respectively pass through the two opposite sides of the touch panel. In addition, the driving lines of the first region pass through the second region, and the driving lines of the third region pass through the fourth region.

In a preferred exemplary embodiment, two above-mentioned touch panels are integrated together to constitute another touch panel.

In a preferred exemplary embodiment, elements of the touch panel are disposed on a color filer (CF) substrate of a liquid crystal display, such as between a protection layer and a color filer of the color filter substrate.

A touch panel in accordance with another exemplary embodiment of the present invention comprises a plurality of driving lines, a plurality of sensing lines and a plurality of sensing units. The sensing lines are arranged intersecting with the driving lines. The sensing units are disposed in an array, and each of the sensing units is electrically coupled to a corresponding one of the driving lines and a corresponding one of the sensing lines. The driving lines or the sensing lines only pass through a single side of the touch panel. Some of the sensing units in a same row in the array are electrically coupled to one of the driving lines while the others of the sensing units in the same row are electrically coupled to another one of the driving lines if the driving lines only pass through the single side of the touch panel; and some of the sensing units in a same column in the array are electrically coupled to one of the sensing lines while the others of the sensing units in the same column are electrically coupled to another one of the sensing lines if the sensing lines only pass through the single side of the touch panel.

In a preferred exemplary embodiment, the sensing lines pass through the single side of the touch panel, and the driving lines pass through two opposite sides of the touch panel. Alternatively, the driving lines pass through the single side of the touch panel, and the sensing lines pass through the two opposite sides of the touch panel.

Since the touch panel are divided into different regions and the sensing units of the different regions are electrically coupled to different driving lines or different sensing lines, that is anyone of the driving lines or the sensing lines is electrically coupled to less sensing units, therefore the present invention can decrease the RC loading and reduce signal attenuation.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Accordingly, the drawings and descriptions will be regarded as illustrative in nature and not as restrictive.

Figure 1:
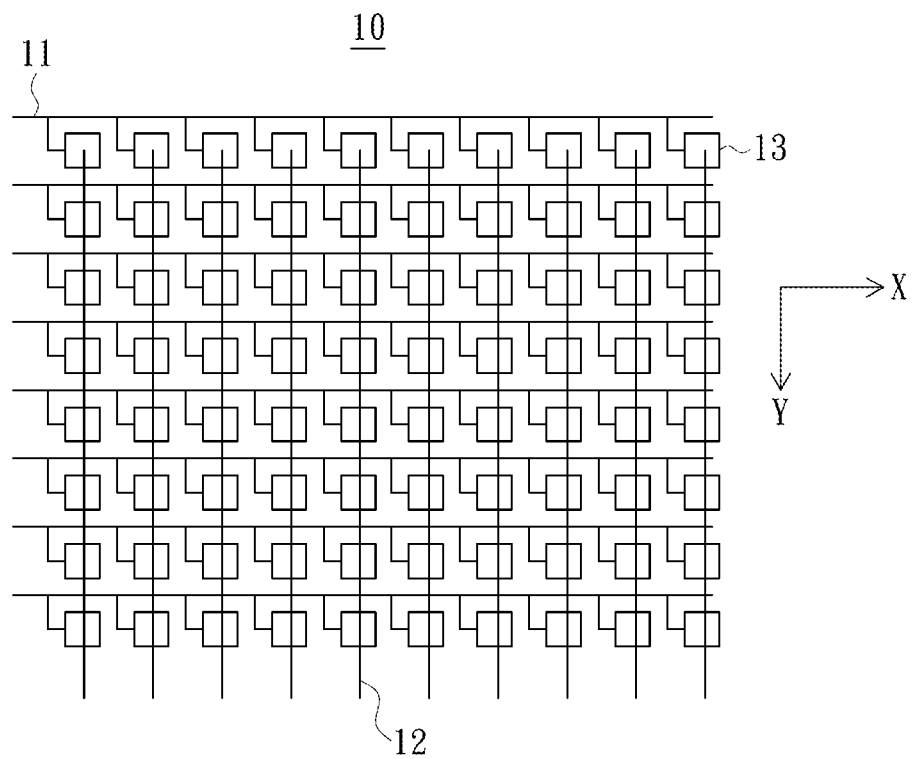
FIG. 1 is a schematic view of a detailed structure of a conventional touch panel.
Figure 2:
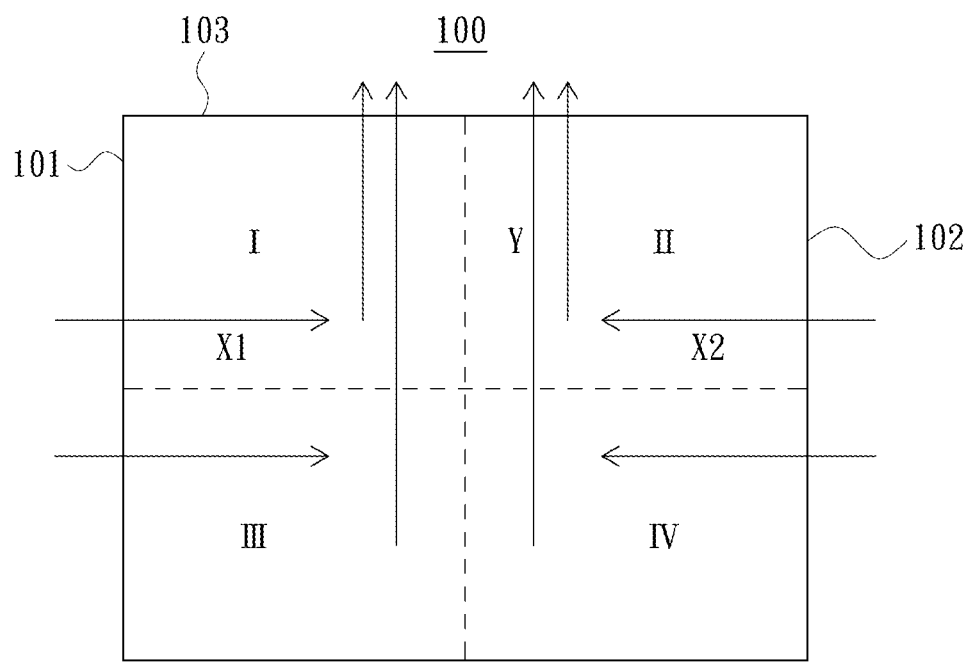
FIG. 2 is a schematic view of a touch panel in accordance with an exemplary embodiment of the present invention.
Figure 3:
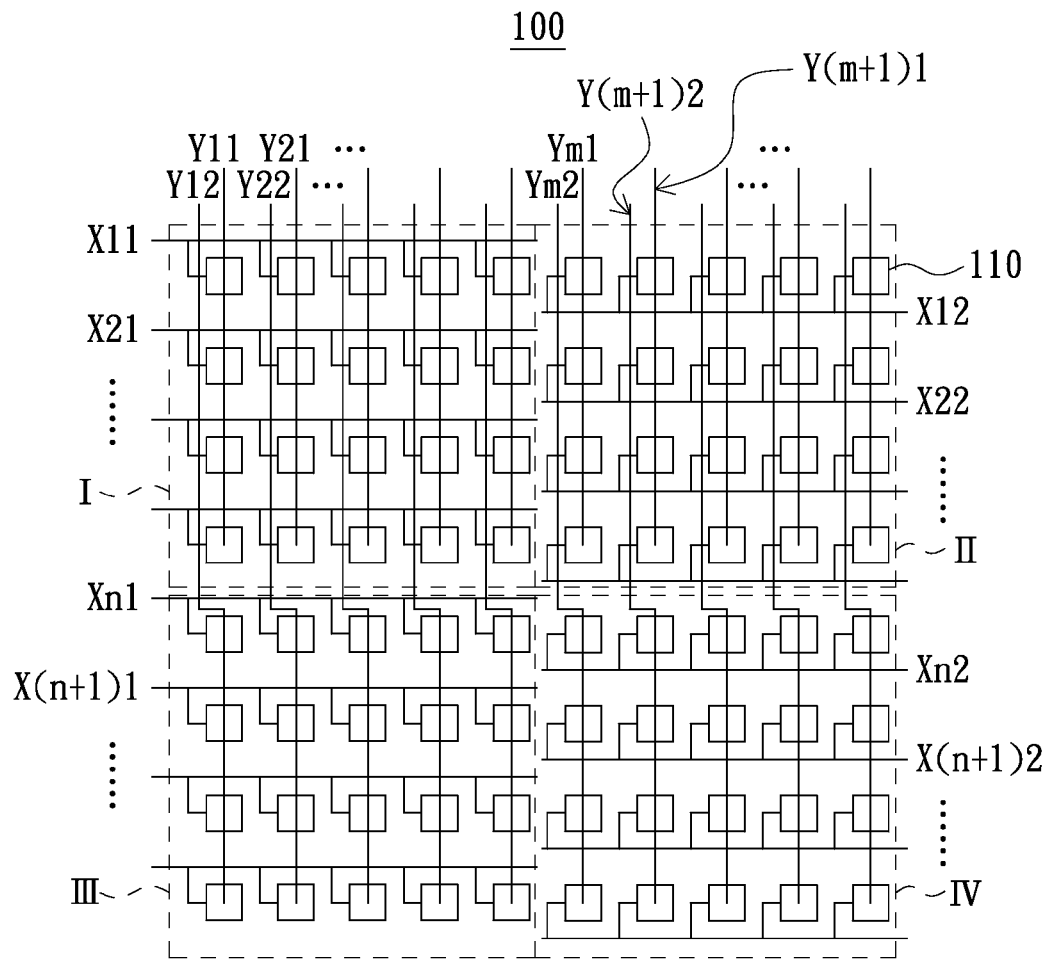
FIG. 3 is a schematic view of a detailed structure of the touch panel as shown in FIG. 2.

Referring to FIGS. 2 and 3, FIG. 2 is a schematic view of a touch panel in accordance with an exemplary embodiment of the present invention, and FIG. 3 is a schematic view of a detailed structure of the touch panel as shown in FIG. 2. As shown in FIGS. 2 and 3, the touch panel 100 is divided into four regions i.e., a first region I, a second region II, a third region III and a fourth region IV. The first region I and the second region II are arranged along a transversal direction, and the third region III and the fourth region IV are also arranged along the transversal direction. The first region I and the third region III are arranged along a longitudinal direction, and the second region II and the fourth region IV are also arranged along the longitudinal direction.

The touch panel 100 comprises a plurality of driving lines X11, X12, X21, X22, . . . , Xn1, Xn2, X(n+1)1, X(n+1)2, . . . , a plurality of sensing lines Y11, Y12, Y21, Y22, . . . , Ym1, Ym2, Y(m+1)1, Y(m+1)2, . . . , and a plurality of sensing units 110, where n and m are natural numbers respectively. The driving lines X11, X12, X21, X22, . . . , Xn1, Xn2, X(n+1)1, X(n+1)2, . . . are arranged intersecting with the sensing lines Y11, Y12, Y21, Y22, . . . , Ym1, Ym2, Y(m+1)1, Y(m+1)2, . . . . The sensing units 110 are arranged in an array. Each of the sensing units 110 is electrically coupled to a corresponding one of the driving lines and a corresponding one of the sensing lines.

The driving lines X11, X12, X21, X22, . . . , Xn1, Xn2, X(n+1)1, X(n+1)2, . . . , the sensing lines Y11, Y12, Y21, Y22, . . . , Ym1, Ym2, Y(m+1)1, Y(m+1)2, . . . , and the sensing units 110 are distributed in the first region I, the second region II, the third region III and the fourth region IV. The driving lines X11, X21, . . . of the first region I pass through a side 101 of the touch panel 100, and the driving lines X12, X22, . . . of the second region II pass through another side 102 of the touch panel 100 opposite to the side 101. Similarly, the driving lines Xn1, X(n+1)1, . . . of the third region III pass through the side 101 of the touch panel 100 as the same to those of the first region I, and the driving lines Xn2, X(n+1)2, . . . of the fourth region IV pass through the side 102 of the touch panel 100 as the same to those of the second region II. The sensing lines Y11, Y21, . . . of the first region I pass through a side 103 of the touch panel 100, and the sensing lines Y12, Y22 . . . of the third region III pass through the first region I and further pass through the same side 103 of the touch panel 100 as the same to the sensing lines Y11, Y21, . . . . Similarly, the sensing lines Ym1, Y(m+1)1, . . . of the second region II pass through the side 103 of the touch panel 100, and the sensing lines Ym2, Y(m+1)2, . . . of the fourth region IV pass through the second region II and further pass through the same side 103 of the touch panel 100. In addition, the sensing units 110 of the first region I in a same row along the first direction are electrically coupled to one of the driving lines, such as the driving line X11, while the sensing units 110 of the second region II in the same row along the first direction are electrically coupled to another of the driving lines, such as the driving line X12. Similarly, the sensing units 110 of the third region III in a same row along the first direction are electrically coupled to one of the driving lines, such as the driving line Xn1, while the sensing units 110 of the fourth region IV in the same row along the first direction are electrically coupled to another one of the driving lines, such as the driving line Xn2. Furthermore, the sensing units 110 of the first region I in a same column along the second direction are electrically coupled to one of the sensing lines, such as the sensing line Y11, while the sensing units 110 of the third region III in the same column along the second direction are electrically coupled to another one of the sensing lines, such as the sensing line Y12. Similarly, the sensing units 110 of the second region II in a same column along the second direction are electrically coupled to one of the sensing lines, such as the sensing line Ym1, while the sensing units 110 of the fourth region IV in the same column along the second direction are electrically coupled to another one of the sensing lines, such as the sensing line Ym2.

That is, the driving lines X11, X12, X21, X22, . . . , Xn1, Xn2, X(n+1)1, X(n+1)2, . . . of the touch panel 100 pass through the two opposite sides 101 and 102 of the touch panel 100, facilitating to input driving signals to the driving lines X11, X12, X21, X22, . . . , Xn1, Xn2, X(n+1)1, X(n+1)2, . . . from the two opposite sides 101 and 102 of the touch panel 100 for driving the sensing units 110. On the contrary, the sensing lines Y11, Y12, Y21, Y22, . . . , Ym1, Ym2, Y(m+1)1, Y(m+1)2, . . . only pass through the side 103 of the touch panel, to read the sensing signals generated by the sensing units 110 through the respective sensing lines Y11, Y12, Y21, Y22, . . . , Ym1, Ym2, Y(m+1)1, Y(m+1)2, . . . out of the side 103. Thus, the touch panel 100 employs two different driving lines such as X11 and X12, to transmit/deliver the driving signals from two opposite directions X1 and X2 to the sensing units 110 in a same row, and employs two different sensing lines such as Y11 and Y12, to read the sensing signals generated by the sensing units 110 in a same column out from a same direction Y.

Since the sensing units 110 in each of the rows of transversally arranged the first region I and the second region II or transversally arranged the third region III and the fourth region IV employ the two different driving lines to transmit the driving signals along the two opposite directions X1 and X2, thus a length of each of the driving lines is greatly decreased, and each of the driving lines is configured for driving less sensing units 110. As a result, the above-mentioned design of the present invention can decrease the RC loading and avoid a serious attenuation of the driving signals.

In addition, although the sensing units 110 in each column of longitudinally arranged the first region I and the third region III or longitudinally arranged the second region II and the fourth region IV read the sensing signals out from the same direction Y, since the touch panel employs the two different sensing lines to respectively read out the sensing units 110 in the same column in the two different regions, thus the amount of the sensing units 110 read out by each of the sensing lines is decreased. Therefore, such design also can decrease the RC loading and avoid the attenuation of the sensing signals in some degree.

It is understood for persons skilled in the art that, the present invention can be modified to be other design manner. For example, the driving lines of the touch panel 100 only pass through a single side of the touch panel, and the sensing lines of the first region I and the third region III or the second region II and the fourth region longitudinally arranged pass through two opposite sides of the touch panel 100 respectively. Furthermore, the driving lines of the first region I pass through the second region II, and the driving lines of the third region III pass through the fourth region IV. In addition, it is understood for persons skilled in the art that, although the touch panel 100 of the exemplary embodiment is uniformly divided into four regions with same size, the present invention can be non-uniformly divided into four regions instead. Furthermore, although the above embodiments makes the sensing lines or the driving lines of the touch panel 100 only pass through a single side of the touch panel, and makes others of the sensing lines or the driving lines of the touch panel 100 pass through two opposite sides of the touch panel 100 respectively, the present invention also may makes not only the sensing lines of the touch panel 100 only pass through a single side of the touch panel, but also the driving lines of the touch panel 100 only pass through another single side of the touch panel 100 different from the above single side thereof.

Figure 4:
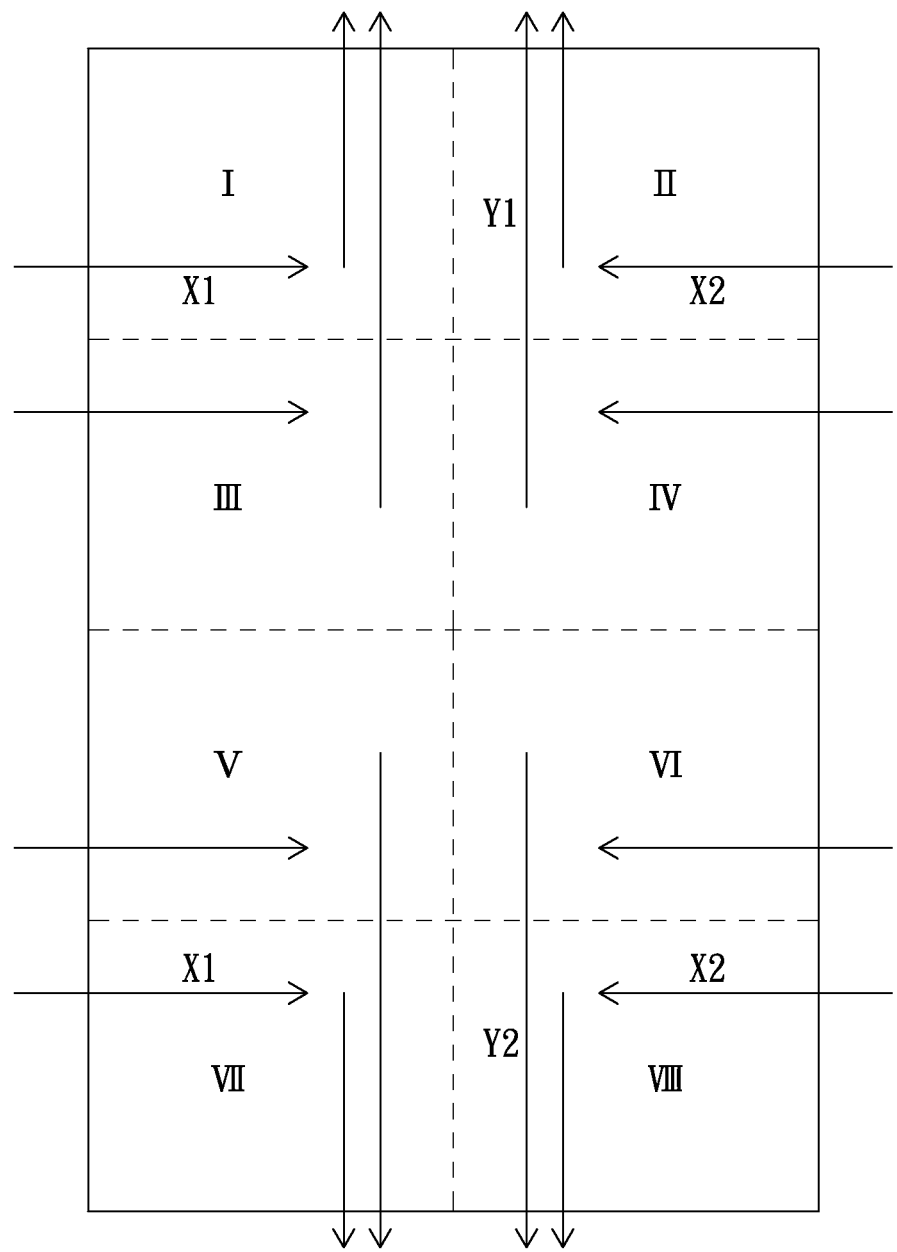
FIG. 4 is a schematic view of a touch panel in accordance with another exemplary embodiment of the present invention.

Referring to FIG. 4, which is a schematic view of a touch panel in accordance with another exemplary embodiment of the present invention. As shown in FIG. 4, the touch panel 200 is composed of two touch panels 100 as shown in FIG. 3, the sensing lines of one of the touch panels 100 extending out along a direction Y1, and the sensing lines of the other one of the touch panels 100 extending out along another direction Y2 opposite to the direction Y1, and thereby constitute a touch panel with a larger size. In other words, the touch panel 200 may be an integral touch panel and be divided into eight regions. The sensing lines of the I-IV regions extend out along the direction Y1 while the sensing lines of the V-VIII extend out along the direction Y2, the direction Y1 is opposite to the direction Y2.

Furthermore, it is understood for persons skilled in the art that, the elements (including the driving lines, sensing lines and sensing units) of the touch panel of the present invention may be disposed on a color filter (CF) substrate of a liquid crystal display, such as disposed between a protection layer and a color filer of the CF substrate, to endow the liquid crystal display with a touch function. Alternatively, the elements of the touch panel of the present invention may be disposed on an independent substrate from the CF substrate, so as to provide an independent touch interface.

In summary, since the touch panel are divided into different regions and the sensing units of the different regions are electrically coupled to different driving lines or different sensing lines, that is anyone of the driving lines or the sensing lines is electrically coupled to less sensing units, therefore the present invention can decrease the RC loading and reduce signal attenuation.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A touch panel, wherein the touch panel has a first region, a second region, a third region and a fourth region, the first region and the second region being arranged along a first direction, the third region and the fourth region being arranged along the first direction, the first region and the third region being arranged along a second direction, the second region and the fourth region being arranged along the second region, the first direction being substantially perpendicular to the second direction, and the first through fourth regions comprising:

a plurality of driving lines, comprising a first group of driving lines configured in the first region, a second group of driving lines configured in the second region, a third group of driving lines configured in the third region, and a fourth group of driving lines configured in the fourth region;

a plurality of sensing lines arranged intersecting with the driving lines, comprising a first group of sensing lines configured in the first region, a second group of sensing lines configured in the second region, a third group of sensing lines configured in the third region and the first region, and a fourth group of sensing lines configured in the fourth region and the second region; and a plurality of sensing units arranged in an array, and each of the sensing units being electrically coupled to a corresponding one of the driving lines and a corresponding one of the sensing lines;

wherein the sensing units of the first region in a same row along the first direction are electrically coupled to one of the first group of driving lines, the sensing units of the second region in a same row along the first direction are electrically coupled to one of the second group of driving lines, the sensing units of the third region in a same row along the first direction are electrically coupled to one of the third group of driving lines, and the sensing units of the fourth region in a same row along the first direction are electrically coupled to one of the fourth group of driving lines;

wherein the sensing units of the first region in a same column along the second direction are electrically coupled to one of the first group of sensing lines, the sensing units of the second region in a same column along the second direction are electrically coupled to one of the second group of sensing lines, the sensing units of the third region in a same column along the second direction are electrically coupled to one of the third group of sensing lines, and the sensing units of the fourth region in a same column along the second direction are electrically coupled to one of the fourth group of sensing lines;

wherein the first through fourth groups of sensing lines pass through a single side of the touch panel, the first and second groups of the driving lines respectively pass through two opposite sides of the touch panel, and the third and fourth groups of the driving lines respectively pass through the two opposite sides of the touch panel;

wherein the third group of sensing lines passes through the first region without being electrically coupled to the sensing units of the first region, and the fourth group of sensing lines passes through the second region without being electrically coupled to the sensing units of the second region.

2. The touch panel as claimed in claim 1, wherein the driving lines of each of the first through fourth regions pass through the single side of the touch panel, the sensing lines of the first region and the sensing lines of the third region respectively pass through two opposite sides of the touch panel, and the sensing lines of the second region and the sensing lines of the fourth region respectively pass through the two opposite sides of the touch panel.

3. The touch panel as claimed in claim 2, wherein the driving lines of the first region pass through the second region, and the driving lines of the third region pass through the fourth region.

4. The touch panel as claimed in claim 1, wherein the touch panel is integrated with another touch panel same as claimed in claim 1 to constitute a larger touch panel.

5. The touch panel as claimed in claim 1, wherein the touch panel is disposed on a color filer (CF) substrate of a liquid crystal display.

6. The touch panel as claimed in claim 5, wherein the touch panel is disposed between a protection layer and a color filer of the color filter substrate.

* * * * *